US010282987B2

(12) United States Patent
Aoki et al.

(10) Patent No.: US 10,282,987 B2
(45) Date of Patent: May 7, 2019

(54) SYSTEM, APPARATUS, AND METHOD FOR DRIVING SUPPORT

(71) Applicant: FUJITSU LIMITED, Kawasaki-shi, Kanagawa (JP)

(72) Inventors: Yasuhiro Aoki, Kawasaki (JP); Takushi Fujita, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/881,888

(22) Filed: Jan. 29, 2018

(65) Prior Publication Data
US 2018/0218598 A1   Aug. 2, 2018

(30) Foreign Application Priority Data
Feb. 2, 2017   (JP) ................. 2017-017733

(51) Int. Cl.
| G08G 1/09 | (2006.01) |
|---|---|
| G08G 1/0967 | (2006.01) |
| G07C 5/02 | (2006.01) |
| B60Q 9/00 | (2006.01) |
| B60W 40/09 | (2012.01) |
| G08G 1/01 | (2006.01) |
| B60W 50/14 | (2012.01) |

(52) U.S. Cl.
CPC ............. G08G 1/0967 (2013.01); B60Q 9/00 (2013.01); B60W 40/09 (2013.01); B60W 50/14 (2013.01); G07C 5/02 (2013.01); G08G 1/0112 (2013.01); G08G 1/0129 (2013.01); G08G 1/0133 (2013.01); G08G 1/096716 (2013.01);
(Continued)

(58) Field of Classification Search
CPC .. G08G 1/0967; G08G 1/0112; G08G 1/0129; G08G 1/0133; G08G 1/096716; G08G 1/096741; G08G 1/096775; B60Q 9/00; B60W 40/09; B60W 50/14; B60W 2540/28; B60W 2540/30; B60W 2550/12;
(Continued)

(56) References Cited

U.S. PATENT DOCUMENTS 9,047,721 B1 * 6/2015 Botnen .................. G07C 5/008
9,117,246 B2 * 8/2015 McClellan ............. G06Q 40/08
(Continued)

FOREIGN PATENT DOCUMENTS

| JP | 11-025389 | 1/1999 |
|---|---|---|
| JP | 2002-148184 | 5/2002 |

(Continued)

*Primary Examiner* — Zhen Y Wu
(74) *Attorney, Agent, or Firm* — Fujitsu Patent Center

(57) ABSTRACT

A method for driving support includes: collecting driving information from a terminal mounted on a vehicle driven by a driver, the driving information including data acquired by the terminal during the vehicle is driven by the driver; evaluating a degree of safe driving of the driver in accordance with the driving information; determining whether driving behavior of the driver varies based on the driving information when the driver is a person for whom a degree of safe driving is evaluated higher than a threshold; executing a determination process for determining that a road section identified by the driving information is in a condition turning into bad road when the driving behavior is determined as being varied in accordance with the driving information; and updating road surface condition information that indicates a road surface condition in the road section, based on a result of determination in the determination process.

12 Claims, 15 Drawing Sheets

(52) U.S. Cl.
CPC . *G08G 1/096741* (2013.01); *G08G 1/096775* (2013.01); *B60W 2540/28* (2013.01); *B60W 2540/30* (2013.01); *B60W 2550/12* (2013.01); *B60W 2550/14* (2013.01); *B60W 2550/148* (2013.01); *B60W 2550/20* (2013.01); *B60W 2550/408* (2013.01)

(58) Field of Classification Search
CPC ....... B60W 2550/14; B60W 2550/148; B60W 2550/20; B60W 2550/408; G07C 5/02
USPC .......................................................... 340/905
See application file for complete search history.

(56) References Cited

U.S. PATENT DOCUMENTS

| | | | |
|---|---|---|---|
| 9,147,353 B1* | 9/2015 | Slusar | G09B 19/167 |
| 9,162,684 B2* | 10/2015 | Oda | B60W 50/04 |
| 9,390,452 B1* | 7/2016 | Biemer | G06Q 40/08 |
| 10,037,689 B2* | 7/2018 | Taylor | G08G 1/0141 |
| 2008/0243558 A1* | 10/2008 | Gupte | G06Q 40/08 705/4 |
| 2011/0025483 A1* | 2/2011 | Yano | B60K 31/0008 340/436 |
| 2016/0210857 A1* | 7/2016 | Gao | G08G 1/09 |
| 2016/0250983 A1* | 9/2016 | Miller | B60R 16/0236 340/439 |
| 2017/0289772 A1* | 10/2017 | Kim | B60W 50/0097 |

FOREIGN PATENT DOCUMENTS

| | | |
|---|---|---|
| JP | 2008-197819 | 8/2008 |
| JP | 2009-080659 | 4/2009 |
| JP | 2009-230720 | 10/2009 |
| JP | 2013-068986 | 4/2013 |
| JP | 2016-033703 | 3/2016 |

\* cited by examiner

FIG. 3

| DRIVING SUPPORT TERMINAL IDENTIFICATION INFORMATION | DATE OF ACQUISITION (TIME INFORMATION) | POSITION INFORMATION | | VEHICLE SPEED INFORMATION | DRIVER IDENTIFICATION INFORMATION |
|---|---|---|---|---|---|
| | | LATITUDE | LONGITUDE | | |
| 01 | 2016/1/1 15:10:05 | A1 | A2 | A3 | 01 |
| 01 | 2016/1/1 15:10:06 | B1 | B2 | B3 | 01 |
| ... | ... | ... | ... | ... | ... |

FIG. 4

| DRIVER IDENTIFICATION INFORMATION | DEGREE OF SAFE DRIVING | EVALUATION UPDATED DATE |
|---|---|---|
| A | A+ | 2016/12/18 |
| B | A++ | 2017/1/1 |
| ... | ... | ... |

FIG. 5

| ROAD SECTION IDENTIFICATION INFORMATION | RANGE OF ROAD SECTION POSITION INFORMATION OF LATITUDE AND LONGITUDE OF TWO OPPOSITE VERTICES | ROAD SURFACE CONDITION | DATE AND TIME OF UPDATE (TIME INFORMATION) |
|---|---|---|---|
| ROAD SECTION IDENTIFICATION INFORMATION 01 | STARTING POINT (LONGITUDE A1, LATITUDE B1) - END POINT (LONGITUDE C1, LATITUDE D1) | CONDITION TURNING INTO BAD ROAD | 2017/1/10 19:16:34 |
| ROAD SECTION IDENTIFICATION INFORMATION 02 | STARTING POINT (LONGITUDE C1, LATITUDE D1) - END POINT (LONGITUDE E1, LATITUDE F1) | CONDITION HAVING TURNED INTO BAD ROAD | 2017/1/10 19:09:34 |
| ⋮ | ⋮ | ⋮ | ⋮ |

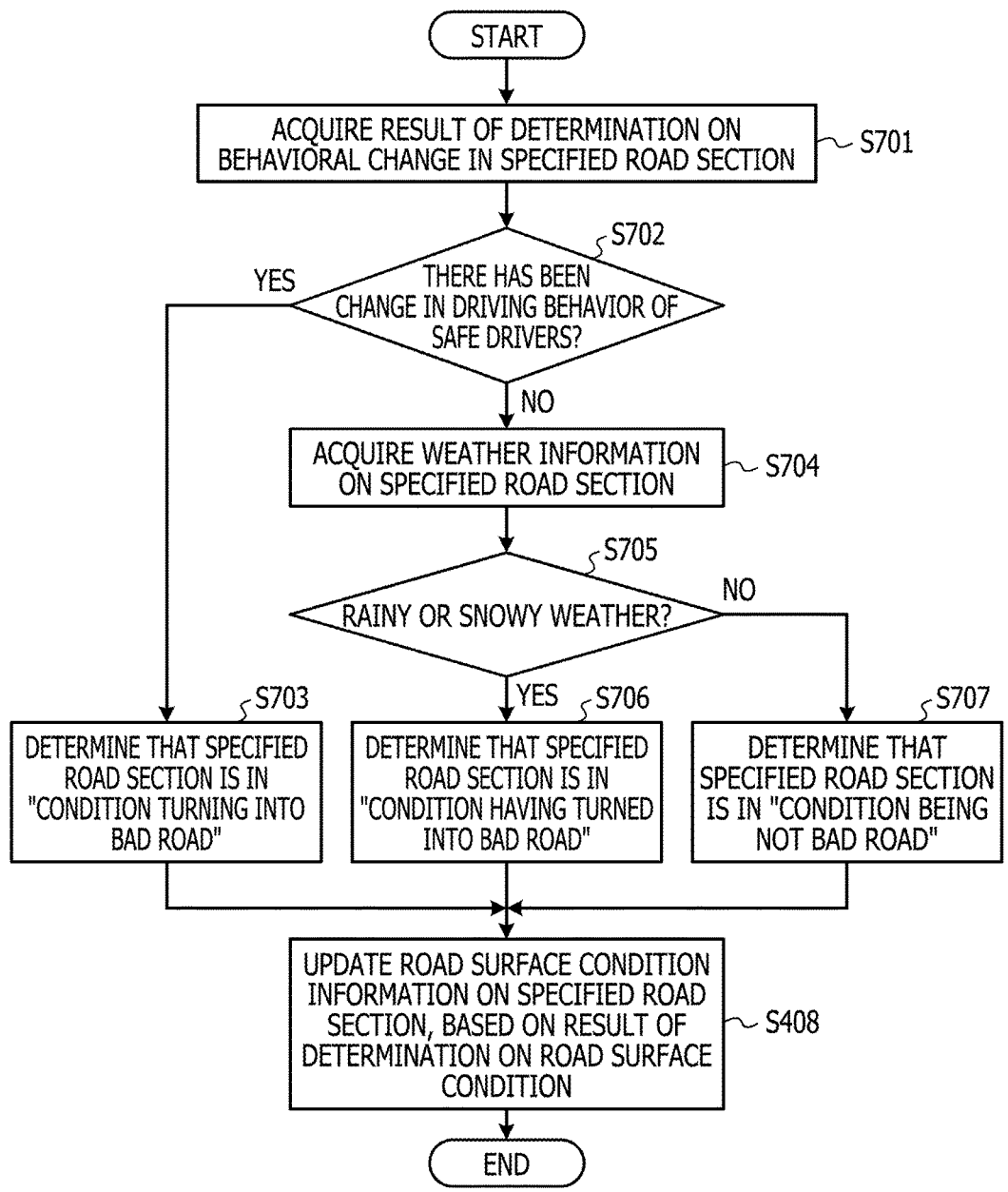

SYSTEM, APPARATUS, AND METHOD FOR DRIVING SUPPORT

CROSS-REFERENCE TO RELATED APPLICATION

This application is based upon and claims the benefit of priority of the prior Japanese Patent Application No. 2017-017733, filed on Feb. 2, 2017, the entire contents of which are incorporated herein by reference.

FIELD

The embodiment discussed herein is related to a system for driving support, an apparatus for driving support, and a method for driving support.

BACKGROUND

In order to inhibit occurrence of accidents of vehicles that are caused by slippery road conditions, it is effective to determine whether a surface of a road is in a slippery condition or not and to inform a driver or the like of a result of determination and thus various proposals have been produced.

For instance, an apparatus in which a laser that irradiates a road surface is installed and which detects a condition of the road surface and an apparatus in which a sound sensor is installed on a vehicle and which determines a road surface condition based on noises in and around the travelling vehicle have been proposed.

Examples of the related art include Japanese Laid-open Patent Publication Nos. 2002-148184 and 2013-68986.

SUMMARY

According to an aspect of the invention, A method for driving support includes: executing a collecting process that includes collecting, from a terminal mounted on a vehicle driven by a driver, driving information corresponding to the driver, the driving information including data acquired by the terminal during the vehicle is driven by the driver; executing an evaluation process that includes evaluating a degree of safe driving of the driver in accordance with the driving information; executing a behavioral change determination process that includes determining whether driving behavior of the driver varies in accordance with the driving information corresponding to the driver when the driver is a person for whom a degree of safe driving is evaluated higher than a threshold; executing a road surface condition determination process that includes determining that a road section identified by the driving information corresponding to the driver is in a condition turning into bad road when the driving behavior of the driver is determined as being varied in accordance with the driving information corresponding to the driver; and executing an update process that includes updating road surface condition information that indicates a road surface condition in the road section, based on a result of determination in the road surface condition determination process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an explanatory drawing that illustrates an example of driving information;

FIG. 4 is an explanatory drawing that illustrates an example of driver information;

FIG. 5 is an explanatory drawing that illustrates an example of road surface condition information;

FIG. 15 is a flow chart that illustrates an example of control flow through which a road surface condition is determined into any of three conditions.

DESCRIPTION OF EMBODIMENT

When it begins to rain, in general, tires of vehicles may be more prone to skid due to rise of dust or mud onto a road surface. For driving support, therefore, it is effective to detect a beginning of rainfall or the like and to inform a driver or the like of a result of detection. Such detection of the beginning of rainfall or the like is, however, difficult for related arts because the road surface has not been completely wetted due to light precipitation.

According to an aspect of the present disclosure, provided are technologies for determining whether a road section is in a condition turning into bad road or not.

Hereinbelow, an embodiment of the disclosure will be described, however, the disclosure is not limited to the embodiment at all.

A "system for driving support" of the disclosure includes an "apparatus for driving support" and a "terminal for driving support" and control that is exerted by components of a control device in the "apparatus for driving support" of the disclosure is synonymous with embodiment of a "method for driving support" of the disclosure. Therefore, details of the "method for driving support" of the disclosure will be elucidated through description on the "apparatus for driving support" of the disclosure.

The "apparatus for driving support" may be referred to as "information processing equipment" or "server equipment" and the "terminal for driving support" may be referred to as "on-board unit" or "terminal equipment for driving support".

Embodiment (System for Driving Support)

Figure 1:
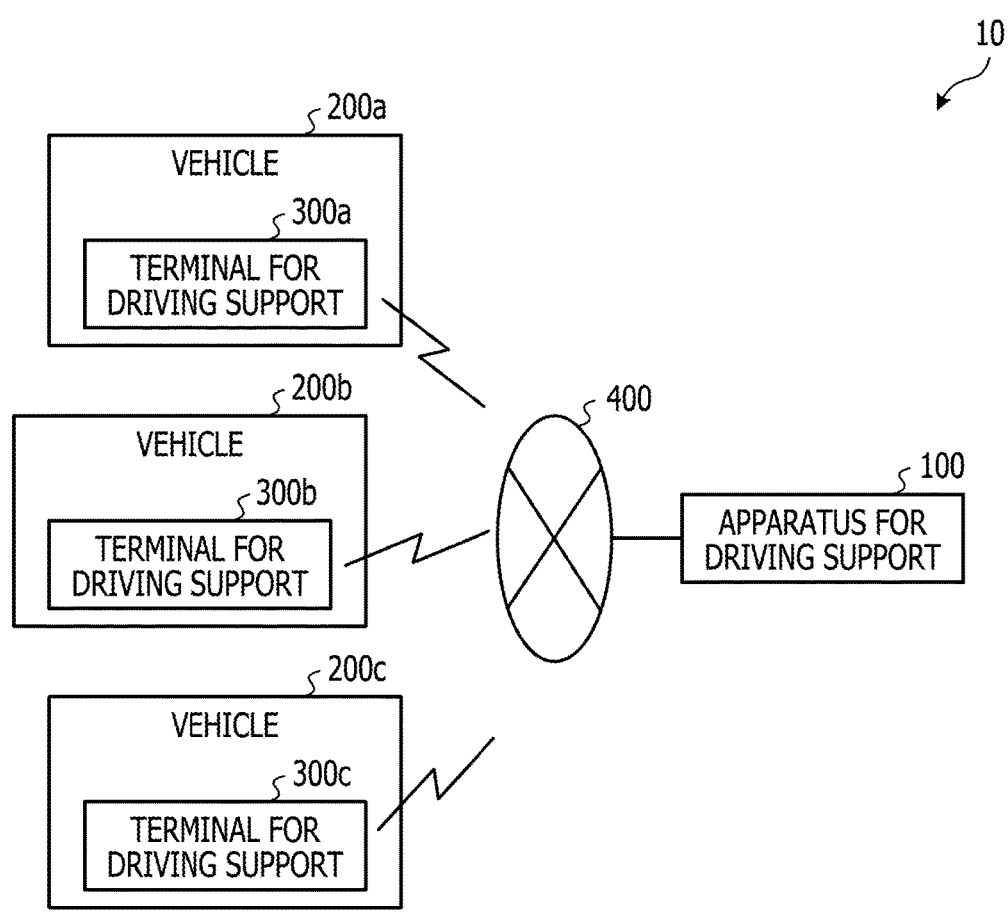
FIG. 1 is an explanatory drawing that illustrates a configuration of a system for driving support including an apparatus for driving support in accordance with an embodiment of the disclosure.

FIG. 1 is an explanatory drawing that illustrates a configuration of the system for driving support 10 including the apparatus for driving support 100 in accordance with the embodiment of the disclosure. The method for driving support is embodied by embodiment of the apparatus for driving support 100.

As illustrated in FIG. 1, the system for driving support 10 has a form of so-called "connected car" that collects and analyzes information, acquired by terminals for driving support 300a, 300b, and 300c installed on vehicles 200a, 200b, and 200c, respectively, through a network 400 in real time in order to acquire various types of information such as conditions of the vehicles 200a, 200b, and 200c and conditions of surrounding roads.

The system for driving support 10 evaluates a degree of safe driving in advance based on past driving information of each driver, determines that a road section in which there has been a change in driving behavior of drivers (who may be referred to as "safe drivers" below) for whom high evaluations have been made on the degree of safe driving is in the "condition turning into bad road", and informs a driver or the like of the road section having undergone such determination.

In techniques disclosed in Japanese Laid-open Patent Publication Nos. 2002-148184 and 2013-68986, it is determined with use of a sensor or the like installed on a road or a vehicle whether a road surface is in a "condition having turned into bad road" or not. By contrast, the system for driving support 10 determines based on the change in the driving behavior of the safe drivers whether a road surface is in the "conditions turning into bad road" or not. It is thought that the "condition having turned into bad road", such as a condition in which puddles have been made on the road surface by heavy rainfall, for instance, may be determined based on the change in the driving behavior because most drivers carefully drive with a slowdown or the like in the "condition having turned into bad road". The "condition turning into bad road" with rise of dust or mud on the road surface at the beginning of rainfall or the like, however, is also prone to cause a skid. In the "condition turning into bad road", it differs among drivers to what extent the driving behavior becomes careful. Therefore, it is difficult to determine whether a road surface is in the "condition turning into bad road" or not. In the system for driving support 10, based on the above, attention is focused on a fact that the driving behavior of the safer drivers may become careful at the earlier stages because the safe drivers sufficiently recognize risks that are entailed by the condition with the rise of dust or mud on a road surface.

The "bad road" herein refers to a road in a condition in which drivers are desired to lower vehicle speeds. As examples of the bad road, a road on which a road surface condition has been worsened, a road in a condition in which visibility has been worsened, a road in a condition in which decrease in a vehicle speed is desired due to a weather phenomenon, and the like may be enumerated.

As examples of the road on which the road surface condition has been worsened, a road in a condition in which puddles have been made by rainfall, a road in a snow-covered condition, a road in a muddy condition caused by rainfall or snowfall, a road in an icy condition caused by decrease in air temperature, a road in an inundated condition caused by high tide, a flood, or the like, and others may be enumerated.

As examples of the road in the condition in which the visibility has been worsened, a road in a condition in which the visibility has been worsened by heavy rainfall or snowfall, a road in a condition in which the visibility has been worsened by turbid fog, a road in a condition in which the visibility has been worsened by a large amount of scattering yellow sand, a road in a condition in which drivers feel dazzled by sunlight or the like, and others may be enumerated.

As examples of the road in the condition in which the decrease in the vehicle speed is desired due to a weather phenomenon, a road in a condition exposed to strong wind and the like may be enumerated.

The "condition turning into bad road" refers to a condition in a process through which a condition being not the "bad road" turns into a condition in which rain or snow begins to fall, in which an air temperature is about to drop to below freezing, in which fog begins to form, in which wind has been getting up, or in which a typhoon has been approaching and turns into the "bad road".

A road surface in the "condition turning into bad road" is a slippery road surface. For instance, the road surface in the "condition turning into bad road" refers to a road surface in the condition with the rise of dust or mud on the road surface at the beginning of rainfall or snowfall, a road surface that begins to be covered with snow, a road surface that appears to be possibly icy, or the like and particularly refers to such a road surface on an expressway where vehicles travel at high speeds. The road surface in the "condition having turned into bad road" is a road surface that may be recognized to be slippery by a driver at a glance and refers to a road surface on which puddles have been made, a road covered with snow, an icy road, or the like, for instance.

The road section refers to a road sectioned at intervals of 50 m, a road sectioned at every intersection, a road sectioned at every distance mark (kilometer-post), or the like, for instance, and enables identification for each road section.

The change in the driving behavior refers to the change by which the driving behavior is made more careful because the driver thinks that a road surface will become slippery at the beginning of rainfall or the like. As examples of the change in the driving behavior, a slowdown for avoidance of a skid, ensuring of a long inter-vehicle distance for avoidance of a rear-end collision upon a skid, avoidance of hard braking, and the like may be enumerated.

There is no particular limitation on the driver as long as the driver is of a vehicle on which the terminal for driving support is installed and has driving information to such an extent that the degree of safe driving may be evaluated. As examples of the driver, a driver of such a commercial vehicle as a truck, a driver of a general vehicle, and the like may be enumerated.

There is no particular limitation on the vehicle 200 as long as the terminal for driving support 300 may be installed on the vehicle 200 and a publicly-known vehicle may be appropriately used. As examples of the vehicle 200, a commercial vehicle such as a truck, a general vehicle, and the like may be enumerated.

In the embodiment, the apparatus for driving support 100 initially collects "driving information including position information, vehicle speed information, and time information", based on drives of the vehicles 200a, 200b, and 200c and acquired by the terminals for driving support 300a, 300b, and 300c, through the network 400 in real time. Driver identification information is mapped to the driving information so that the drivers of the vehicles 200a, 200b, and 200c may be individually identified. The driver identification information is inputted when the driver gets in the vehicle and is stored in the terminal for driving support.

Subsequently, the apparatus for driving support 100 evaluates the degree of safe driving of each driver exhaustively at all times based on the driving information of the driver during a past half year. Though the driving information for use in evaluation of the degree of safe driving is the driving information during the past half year in the embodiment, a period of the driving information may be appropriately changed in accordance with a frequency or the like of driving by the driver without limitation to the half year. Though the degree of safe driving of each driver is evaluated exhaustively at all times in the embodiment, the evaluation may be made for every specified period without limitation to the above.

The apparatus for driving support 100 specifies each road section in an area such as a country, a prefecture, and a municipality or in a specified region sectioned rectangularly on a road map, determines whether the driving behavior of the drivers has become careful or not, based on the driving information on the safe drivers among the driving information on all the drivers in last one hour, and updates road surface condition information stored in a database by estimating that road sections for which change into careful driving behavior has been determined are in the condition turning into bad road. The apparatus for driving support 100 updates the road surface condition information exhaustively at all times on each road section in the specified region.

The terminals for driving support 300 fall under a type of terminals for car navigation systems and each have functions of searching for a route from a place of departure to a destination and guiding the driver. When guiding the driver along the route that has been searched for, the terminal for driving support 300 requests the apparatus for driving support 100 to transmit the road surface condition information that is information on the road surface conditions in the road sections on the route.

The apparatus for driving support 100 transmits the latest road surface condition information on the road sections on the route to the terminal for driving support 300 that is a requestor and the terminal for driving support 300 informs the driver of the road sections determined as road sections in the condition turning into bad road. The terminal for driving support 300 may search for the route so as to avoid the road sections determined as the road sections in the condition turning into bad road.

In a method of searching for the route so as to avoid the road sections in the condition turning into bad road, the terminal for driving support 300 may also acquire information on the degree of safe driving of the driver who is driving, when acquiring the road surface condition information from the apparatus for driving support 100. Then the route may be searched for so as to avoid the road sections that are turning into bad roads, for a dangerous driver, or the information may be indicated on a display without a route search for avoiding the road sections that are turning into bad roads, for a safe driver, for instance.

Thus accidents may be obviated by determination that the road sections for which the change in the driving behavior of the safe drivers has been determined based on the past driving information are in the condition turning into bad road and by informing the driver or the like of the determined road sections.

Though the latest road surface condition information on the road sections in the "condition turning into bad road" is updated in the embodiment, the latest road surface condition information including the "condition having turned into bad road" may be updated without limitation to the above.

The system for driving support 10 may inform operation managers for trucks, buses, and the like, other drivers who are driving in a specified region, road administrators for expressways or the like existing in the specified region, or others of the latest road surface condition information on the road sections in the specified region and may display the latest road surface condition information on road sign boards or websites, for instance.

Hereinbelow, the terminals for driving support 300a, 300b, and 300c installed respectively on the vehicles 200a, 200b, and 200c will be described. The terminals for driving support 300a, 300b, and 300c will be generically referred to as "terminals for driving support 300" for description because functional configurations and hardware configurations of the terminals for driving support 300a, 300b, and 300c are similar. The vehicles 200a, 200b, and 200c, which are similar, also will be generically referred to as "vehicles 200" for description.

The terminals for driving support 300 are preferably installed on a large number of the vehicles 200 in terms of increase in accuracy of the information that is acquired. A plurality of apparatuses for driving support 100 may be provided.

<Apparatus for Driving Support>

Figure 2:
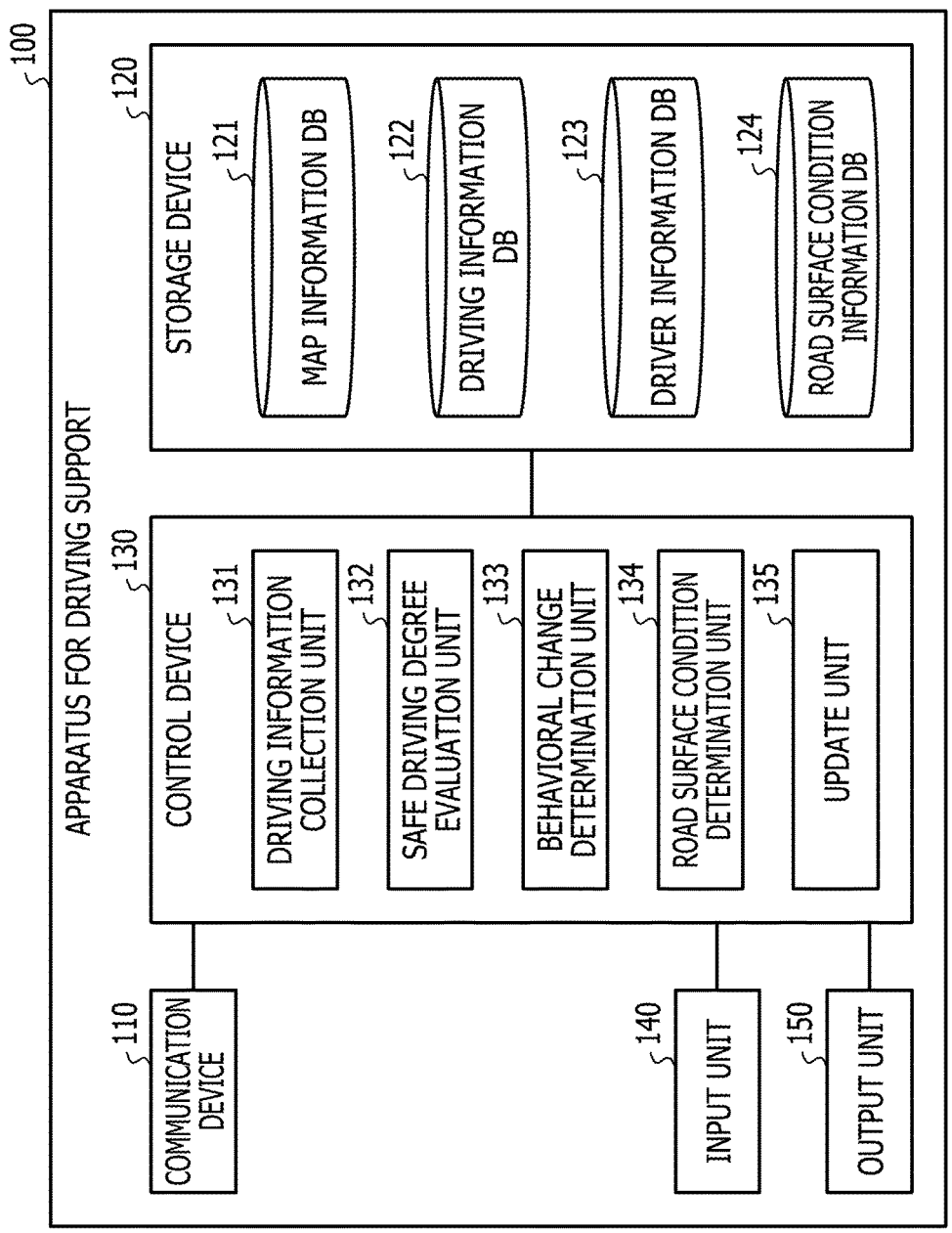
FIG. 2 is an explanatory drawing that illustrates an example of a functional configuration of the apparatus for driving support.

FIG. 2 is an explanatory drawing that illustrates an example of a functional configuration of the apparatus for driving support 100.

As illustrated in FIG. 2, the apparatus for driving support 100 includes a communication device 110, a storage device 120, a control device 130, an input device 140, and an output device 150.

The communication device 110 receives the driving information mapped to the driver identification information from the terminals for driving support 300 and, when a request to transmit the latest road surface condition information on the road sections on the route is inputted from a terminal for driving support 300, transmits the road surface condition information to the terminal for driving support 300.

Though the communication device 110 collects the driving information from the terminals for driving support 300 based on instructions from the control device 130 in the embodiment, the terminals for driving support 300 may transmit the driving information through the network 400 in real time.

The storage device 120 includes a map information DB 121, a driving information DB 122, a driver information DB 123, and a road surface condition information DB 124.

In the map information DB 121, map information including information on the road sections of which positions are identified by longitude and latitude is stored.

FIG. 3 is an explanatory drawing that illustrates an example of the driving information stored in the driving information DB 122.

In the embodiment, as illustrated in FIG. 3, items of "driving support terminal identification information, time information, position information, vehicle speed information, and driver identification information" are mapped and stored in the driving information DB 122.

The "driving support terminal identification information" denotes signs that are used for identification of the terminals for driving support 300.

The "time information" denotes information on time when position information and vehicle speed information are acquired with a GPS unit 314 and a speed sensor unit 315 synchronized.

The "position information" denotes information on longitude and latitude that are measured by the GPS unit 314.

The "vehicle speed information" denotes measurement results on the vehicle speeds measured by the speed sensor unit 315 installed on an axle.

The "driver identification information" denotes signs that are used for identification of the drivers.

Though the embodiment is described with reference to an example in which five types of the driving information, that is, the driving support terminal identification information, the time information, the position information, the vehicle speed information, and the driver identification information are used, there is no limitation to the example.

FIG. 4 is an explanatory drawing that illustrates an example of driver information stored in the driver information DB 123.

In the embodiment, as illustrated in FIG. 4, items of "driver identification information, degree of safe driving, and evaluation updated date" are mapped as the driver information and stored in the driver information DB 123.

The "driver identification information" denotes the signs that are used for the identification of the drivers.

The "degree of safe driving" denotes evaluation results on the degree of safe driving of the drivers.

The "evaluation updated date" denotes information on dates when evaluation of the degree of safe driving is updated.

Though the embodiment is described with reference to an example in which three types of the driver information, that is, the driver identification information, the degree of safe driving, and the evaluation updated date are used, there is no limitation to the example.

FIG. 5 is an explanatory drawing that illustrates an example of the road surface condition information stored in the road surface condition information DB 124.

In the embodiment, as illustrated in FIG. 5, items of "road section identification information, range of road section, road surface condition, and date and time of update" are mapped as the road surface condition information and stored in the road surface condition information DB 124.

The "road section identification information" denotes signs that are used for identification of the road sections.

The "range of road section" denotes position information of the latitude and longitude of two opposite vertices of a road section expressed as a rectangle on a road map.

The "road surface condition" denotes information on road surface conditions determined as any of three conditions of the "condition turning into bad road", the "condition having turned into bad road", and a "condition being not bad road" based on the latest driving information in the relevant road section.

The "date and time of update" denotes information on dates and time when the road surface condition information is updated.

Though the embodiment is described with reference to an example in which four types of road condition information, that is, the road section identification information, the range of the road section, the road surface condition information, and the date and time of update are used, there is no limitation to the example.

The storage device 120 stores various programs installed in the apparatus for driving support 100 or data and the like generated by execution of programs, based on instructions from the control device 130.

«Control Device»

The control device 130 includes a driving information collection unit 131, a safe driving degree evaluation unit 132, a behavioral change determination unit 133, a road surface condition determination unit 134, and an update unit 135.

The control device 130 executes the various programs stored in the storage device 120 and controls the entire apparatus for driving support 100.

—Driving Information Collection Unit—

The driving information collection unit 131 collects the driving information from the terminals for driving support 300 in real time and stores the driving information in the driving information DB 122.

—Safe Driving Degree Evaluation Unit—

The safe driving degree evaluation unit 132 evaluates the degree of safe driving of the drivers based on the driving information.

Specifically, the safe driving degree evaluation unit 132 evaluates the degree of safe driving of each driver based on the driving information on the driver during the past half year and updates the driver information, stored in the driver information DB 123, based on evaluation results on the degree of safe driving. A long period such as the past half year is desirable as the period of the driving information that is used for the evaluation.

As examples of a method of evaluating the degree of safe driving, following methods may be enumerated, for instance. In a method, drivers who have rarely experienced an event in which an accident comes close to occurring may be determined as drivers who tend to conduct safe driving and a value obtained by division of a number of occurrences of the event in which an accident comes close to occurring by a travelling distance may be used as the degree of safe driving. In another method, a degree of wobbling during driving that has not resulted in lane departure may be used as the degree of safe driving. In another method, a sensor capable of continuously measuring a force of pressing down on brakes may be installed on the vehicle and the degree of safe driving may be determined based on strength of the force of pressing. In another method, use of driver monitoring may be made and the degree of safe driving may be determined based on a manner of looking behavior at blind intersections.

In the method in which the value obtained by the division of the number of occurrences of the event in which an accident comes close to occurring by the travelling distance is used as the degree of safe driving, the smaller the obtained value is, the higher the degree of safe driving is. Drivers for whom the values obtained by the division are smaller than a specified value may be determined as safe drivers, for instance.

As examples of the event in which an accident comes close to occurring, sudden braking, an alert from a lane departure warning (LDW) device, and the like may be enumerated.

As examples of a method of determining whether braking is sudden braking or not, a method in which an acceleration sensor is installed on the vehicle and determination is made based on whether a measured acceleration value is equal to or greater than a specified value, and the like may be enumerated. In the above method, information on the acceleration value may be included in the driving information. In a method with use of no acceleration sensor, the vehicle speed may be estimated from time-based change in the position based on the position information and the time information in the driving information, and the acceleration value may be calculated from time-based change in the vehicle speed. Instead of estimation of the vehicle speed from the time-based change in the position, measurement results from the speed sensor may be used without modification.

—Behavioral Change Determination Unit—

The behavioral change determination unit 133 determines whether there has been the change in the driving behavior or not, based on the latest driving information on the safe drivers.

Specifically, the behavioral change determination unit 133 initially reads out the short-term driving information in the last one hour on a road section specified by the behavioral change determination unit 133, from the driving information DB 122. The driving information to be read out from the driving information DB 122 is specified based on whether the position information included in the driving information is included or not in the range of the road section defined by the longitude and latitude in the map information. Subsequently, the behavioral change determination unit 133 refers to the driver identification information mapped to the driving information that has been read out and carries out behavioral change determination in which it is determined whether there has been the change in the driving behavior or not, based on the latest driving information on the safe drivers.

In a method of determining whether there has been the change in the driving behavior or not, an average vehicle speed of the safe drivers and an average vehicle speed of all the drivers may be calculated based on the vehicle speed information included in the driving information in the specified road section. In case where there is a difference equal to or greater than a specified value between the average vehicle speed of the safe drivers and the average vehicle speed of all the drivers, it may be determined that there has been the change in the driving behavior of the safe drivers.

The specified value may be appropriately selected in accordance with environment or the like of the road section and values of 10 km/h or so may be enumerated as examples of the specified value.

The average vehicle speed may be obtained from the vehicle speeds calculated from the time-based change in the position information included in the driving information.

Though the average vehicle speed of the safe drivers and the average vehicle speed of all the drivers are compared in the embodiment, the average vehicle speed of the safe drivers and an average vehicle speed of drivers for whom low evaluations are made on the degree of safe driving (who may be referred to as "dangerous drivers" below) may be compared, without limitation to the above. Thus accuracy in determining whether there has been the change or not in the driving behavior of the safe drivers may be increased.

Though the behavioral change is determined with use of the average vehicle speeds in the embodiment, the behavioral change may be determined with use of average inter-vehicle distances, for instance, without limitation to the above. In a method of determining whether there has been the change in the driving behavior or not in such an example, the average inter-vehicle distance related to the safe drivers and the average inter-vehicle distance related to all the drivers may be calculated based on the position information included in the driving information on the specified road section. Based on whether there is a difference equal to or greater than a specified value or not between the average inter-vehicle distance related to the safe drivers and the average inter-vehicle distance related to all the drivers, it may be determined whether there has been the change or not in the driving behavior of the safe drivers, that is, whether the driving behavior of the safe drivers has become careful or not.

The specified value may be appropriately selected in accordance with the environment or the like of the road section and values of 10 m or so may be enumerated as examples of the specified value.

—Road Surface Condition Determination Unit—

The road surface condition determination unit 134 determines that the road sections for which it is determined by the behavioral change determination unit 133 that there has been the change in the driving behavior are in the condition turning into bad road.

The update unit 135 updates the road surface condition information that indicates the road surface conditions of the roads, based on results of determination by the road surface condition determination unit 134.

The input device 140 receives various requests to the apparatus for driving support 100, based on instructions from the control device 130.

The output device 150 displays an internal condition of the apparatus for driving support 100, based on instructions from the control device 130.

Figure 6:
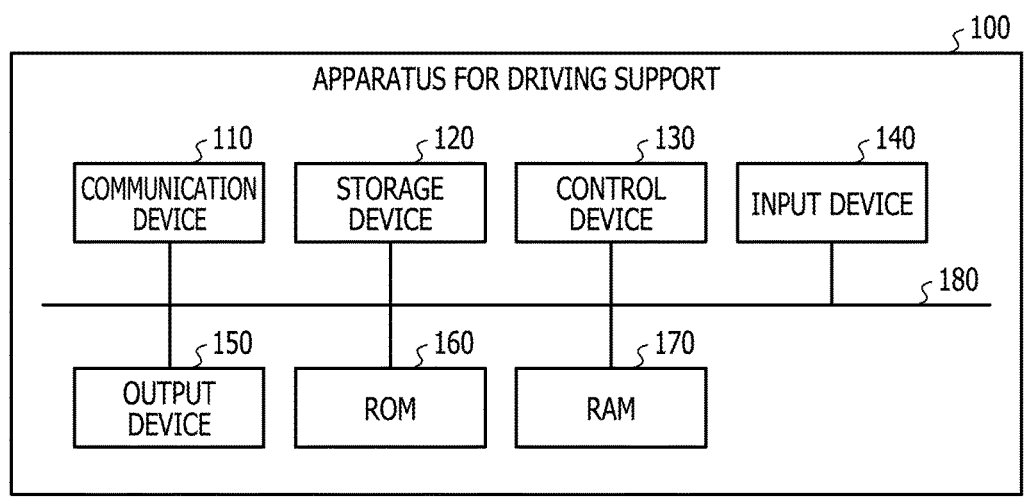
FIG. 6 is an explanatory drawing that illustrates an example of a hardware configuration of the apparatus for driving support.

FIG. 6 is an explanatory drawing that illustrates an example of a hardware configuration of the apparatus for driving support 100.

As illustrated in FIG. 6, the apparatus for driving support 100 includes the communication device 110, the storage device 120, the control device 130, the input device 140, the output device 150, a read only memory (ROM) 160, and a random access memory (RAM) 170. The devices in the apparatus for driving support 100 are communicably connected through a bus 180.

Figure 7:
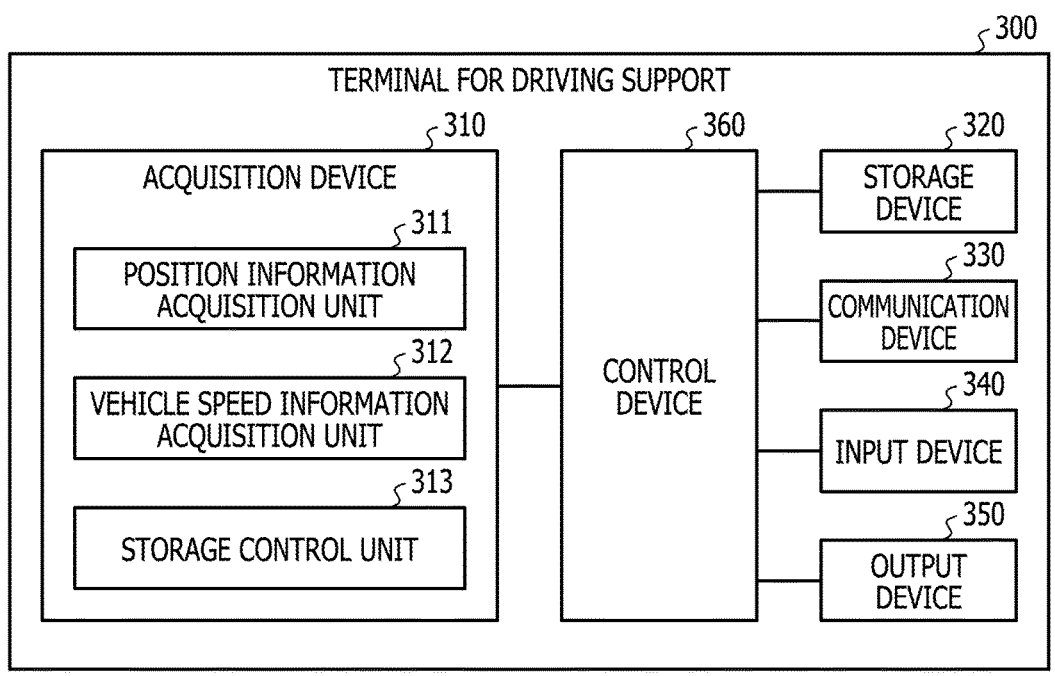
FIG. 7 is an explanatory drawing that illustrates an example of a functional configuration of a terminal for driving support.

There is no particular limitation on the communication device 110 as long as the communication device 110 is communicably connected to a communication device 330 of the terminal for driving support 300 illustrated in FIG. 7 and a publicly-known communication device may be appropriately used.

There is no particular limitation on the storage device 120 as long as various types of information may be stored in the storage device 120 and a storage device may be appropriately selected in accordance with a purpose. For instance, the storage device 120 may be a solid state drive, a hard disc drive, or a portable storage such as a compact disc (CD) drive, a digital versatile disc (DVD) drive, and a Blu-ray® disc (BD) drive or may be a portion of a cloud that is a group of computers on a network.

As examples of the control device 130, a central processing unit (CPU) and the like may be enumerated. A processor that executes software is hardware.

There is no particular limitation on the input device 140 as long as the input device 140 may receive various requests to the apparatus for driving support 100 and a publicly-known input device may be appropriately used. A keyboard, a mouse, a touch panel, a microphone, and the like may be enumerated as examples of the input device 140.

There is no particular limitation on the output device 150 and a publicly-known output device may be appropriately used. A display, a speaker, and the like may be enumerated as examples of the output device 150.

The ROM 160 stores various programs, data, and the like that are demanded in order for the control device 130 to execute the various programs stored in the storage device 120. Specifically, the ROM 160 stores a boot program such as a basic input/output system (BIOS) and an extensible firmware interface (EFI), and the like.

The RAM 170 is a main storage and functions as a workspace that is expanded when the various programs stored in the storage device 120 are executed by the control device 130. As examples of the RAM 170, a dynamic random access memory (DRAM), a static random access memory (SRAM), and the like may be enumerated.

<Terminal for Driving Support>

FIG. 7 is an explanatory drawing that illustrates an example of the functional configuration of the terminal for driving support 300.

As illustrated in FIG. 7, the terminal for driving support 300 includes an acquisition device 310, a storage device 320, the communication device 330, an input device 340, an output device 350, and a control device 360.

The acquisition device 310 includes a position information acquisition unit 311, a vehicle speed information acquisition unit 312, and a storage control unit 313.

The position information acquisition unit 311 and the vehicle speed information acquisition unit 312 acquire the position information of the latitude and the longitude, with use of the GPS unit, and the vehicle speed information, with use of the speed sensor, while being synchronized at specified intervals. There is no particular limitation on the specified intervals for acquisition of the driving information and the specified intervals for the acquisition of the driving information may be set up in accordance with a purpose. As examples of the specified intervals for the acquisition of the driving information, one second and the like may be enumerated.

The storage control unit 313 maps the driving information, including the speed information, the position information of the latitude and the longitude that is acquired in synchronization with timing of the acquisition of the speed information, and time of the acquisition, to the driver identification information that is inputted when the driver gets in the vehicle and stores the driving information in the storage device 320.

The storage device 320 stores the driver identification information on the driver who is driving the vehicle and stores the driving information mapped to the driver identification information by the storage control unit 313. The storage device 320 stores the road surface condition information transmitted from the apparatus for driving support 100.

The storage device 320 stores various programs installed in the terminal for driving support 300, data generated by execution of programs, and the like based on instructions from the control device 360.

The communication device 330 reads out the driving information mapped to the driver identification information from the storage device 320 and transmits the driving information to the apparatus for driving support 100 through the network 400, based on instructions from the control device 360. The communication device 330 receives the road surface condition information from the apparatus for driving support 100 through the network 400, based on instructions from the control device 360.

Into the input device 340, the driver identification information is inputted from the driver when the driver gets in the vehicle.

The input device 340 receives various requests to the terminal for driving support 300 from the driver, based on instructions from the control device 360.

The output device 350 displays a route from a place of departure to a destination that are desired by the driver and informs the driver of the road sections in the condition turning into bad road on the route.

The output device 350 displays an internal condition of the terminal for driving support 300, based on instructions from the control device 360.

The control device 360 makes the communication device 330 output the request to transmit the latest road surface condition information on the road sections on the route and stores the road surface condition information, transmitted from the apparatus for driving support 100 in response to the request, in the storage device 320.

The control device 360 executes the various programs stored in the storage device 320 and controls the entire terminal for driving support 300.

Figure 8:
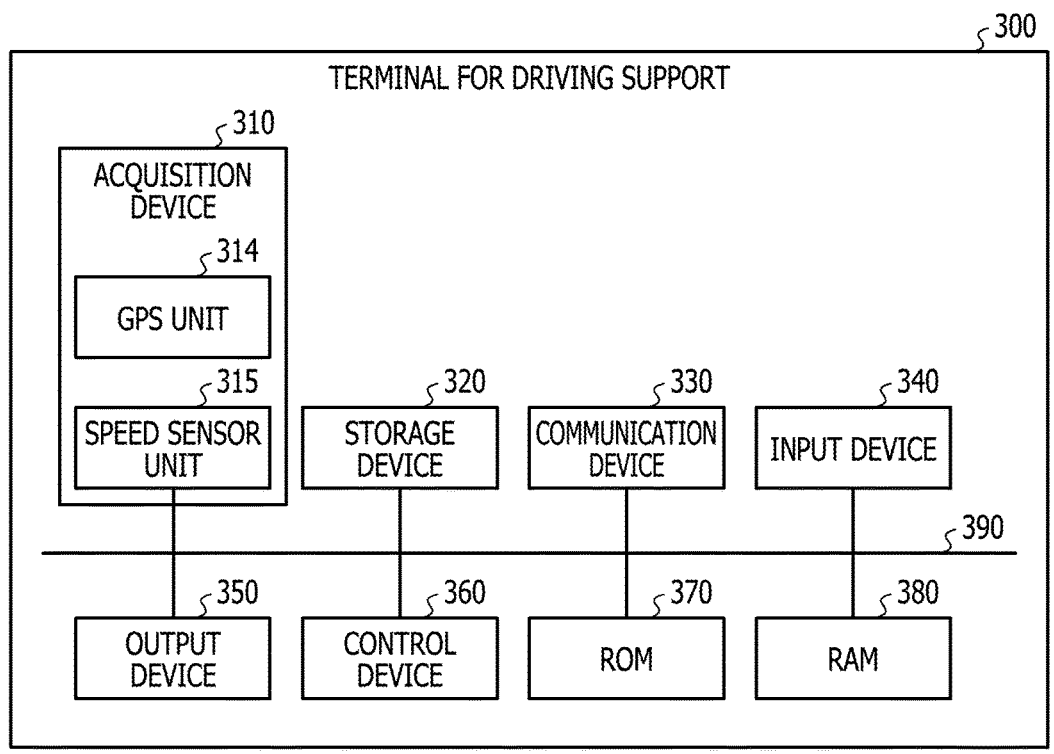
FIG. 8 is an explanatory drawing that illustrates an example of a hardware configuration of the terminal for driving support.

FIG. 8 is an explanatory drawing that illustrates an example of the hardware configuration of the terminal for driving support 300.

As illustrated in FIG. 8, the terminal for driving support 300 includes the acquisition device 310, the storage device 320, the communication device 330, the input device 340, the output device 350, the control device 360, a ROM 370, and a RAM 380. The devices in the terminal for driving support 300 are communicably connected through a bus 390.

The acquisition device 310 includes the GPS unit 314 and the speed sensor unit 315.

The GPS unit 314 acquires the position information of the latitude and the longitude of the vehicle 200 based on instructions from the position information acquisition unit 311.

The speed sensor unit 315 acquires the vehicle speed information based on instructions from the vehicle speed information acquisition unit 312.

There is no particular limitation on the storage device 320 as long as various types of information may be stored in the storage device 320 and a storage device may be appropriately selected in accordance with a purpose. For instance, the storage device 320 may be a solid state drive, a hard disc drive, or a portable storage such as a CD drive, a DVD drive, and a BD drive or may be a portion of a cloud that is a group of computers on a network.

There is no particular limitation on the communication device 330 as long as the communication device 330 is communicably connected to the communication device 110 of the apparatus for driving support 100 illustrated in FIG. 2 and a publicly-known communication device may be appropriately used.

There is no particular limitation on the input device 340 as long as the input device 340 may receive the various requests to the terminal for driving support 300 from the driver and a publicly-known input device may be appropriately used. A touch panel, a microphone, and the like may be enumerated as examples of the input device 340.

There is no particular limitation on the output device 350 as long as the output device 350 may inform the driver of the road sections in the condition turning into bad road and a publicly-known output device may be appropriately used. A display, a speaker, and the like may be enumerated as examples of the output device 350.

As examples of the control device 360, a CPU and the like may be enumerated.

The ROM 370 stores various programs, data, and the like that are demanded in order for the control device 360 to execute the various programs stored in the storage device 320. Specifically, the ROM 370 stores a boot program such as BIOS and EFI, and the like.

The RAM 380 is a main storage and functions as a workspace that is expanded when the various programs stored in the storage device 320 are executed by the control device 360. As examples of the RAM 380, a DRAM, a SRAM, and the like may be enumerated.

There is no particular limitation on the vehicle 200 as long as the terminal for driving support 300 may be installed on the vehicle 200 and a publicly-known vehicle may be appropriately used. A commercial vehicle such as a truck, a general vehicle, and the like may be enumerated as examples of the vehicle 200.

Subsequently, flow of processes that are performed by the system for driving support 10 in the embodiment will be described.

Figure 9:
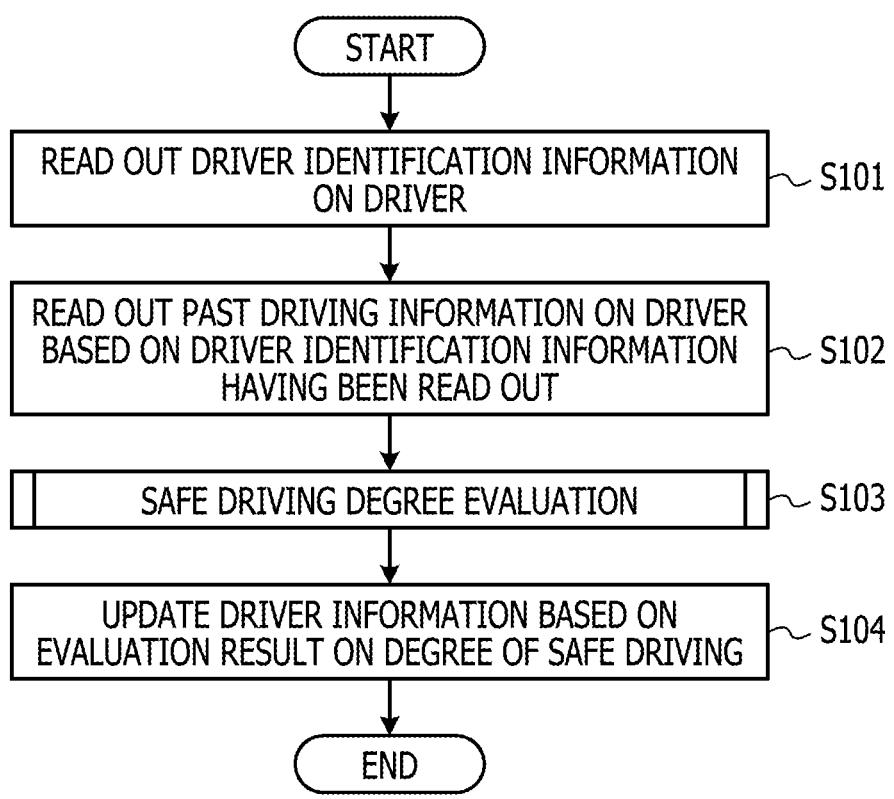
FIG. 9 is a flow chart that illustrates an example of control flow through which a degree of safe driving of a driver is evaluated and the driver information is updated.

FIG. 9 is a flow chart that illustrates an example of control flow through which the degree of safe driving of the driver is evaluated and the driver information is updated.

In accordance with the flow chart illustrated in FIG. 9 with reference to FIG. 2, the control flow will be described through which the driver information stored in the driver information DB 123 is updated with the result of the degree of safe driving evaluated by the safe driving degree evaluation unit 132 based on the driving information on the driver during the past half year.

In step S101, the control device 130 reads out the driver identification information on the driver from the driver information DB 123 and then makes a transition of the process to step S102.

In step S102, the control device 130 reads out the driving information during the past half year from the driving information DB 122, based on the driver identification information that has been read out and then makes a transition of the process to step S103.

In step S103, the safe driving degree evaluation unit 132 evaluates the degree of safe driving based on the driving information on the driver during the past half year and then makes a transition of the process to step S104. Details of the evaluation of the degree of safe driving will be described later.

In step S104, the safe driving degree evaluation unit 132 updates the driver information, stored in the driver information DB 123, based on the evaluation result on the degree of safe driving and then ends the process.

Figure 10:
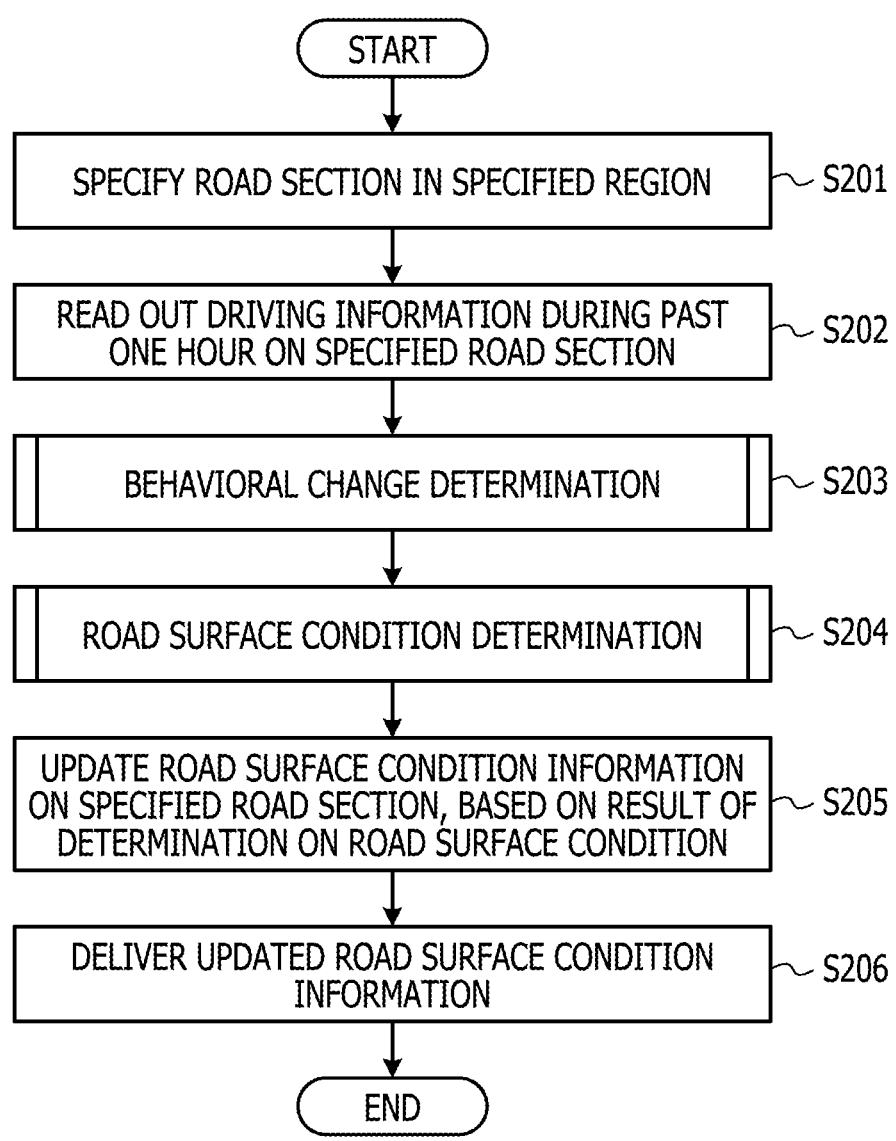
FIG. 10 is a flow chart that illustrates an example of control flow through which the road surface condition information determined based on the driving information is updated and the latest road surface condition information is delivered.

FIG. 10 is a flow chart that illustrates an example of control flow through which the road surface condition information is updated based on the result of the road surface condition determined by the road surface condition determination unit 134.

In accordance with the flow chart illustrated in FIG. 10 with reference to FIG. 2, the control flow will be described through which the road surface condition information stored in the road surface condition information DB 124 is updated with the result of the road surface condition determined by the road surface condition determination unit 134 based on the driving information during the past one hour in the specified road section.

In step S201, the control device 130 specifies the road section in the specified region for which the road surface condition information is to be updated and then makes a transition of the process to step S202.

In step S202, the control device 130 reads out the driving information during the past one hour on the specified road section from the driving information DB 122 and then makes a transition of the process to step S203.

In step S203, the behavioral change determination unit 133 determines whether there has been the change or not in the driving behavior of the safe drivers, based on the driving information during the past one hour that has been read out, and then makes a transition of the process to step S204. Details of the determination on the change in the driving behavior will be described later.

In step S204, the road surface condition determination unit 134 determines the road surface condition in the specified road section based on a result of the determination on the behavioral change and then makes a transition of the process to step S205. Details of the determination on the road surface condition will be described later.

In step S205, the update unit 135 updates the road surface condition information on the specified road section, based on a result of the determination on the road surface condition, and then makes a transition of the process to step S206.

In step S206, the communication device 110 delivers the latest road surface condition information, updated by the update unit 135, to a plurality of terminals for driving support 300 and then ends the process.

By the determination on the road surface condition based on the driving information in a road section and delivery of the latest road surface condition information, based on the result of the determination, to the plurality of terminals for driving support 300, the terminals for driving support 300 are enabled to inform other drivers or the like of presence of the dangerous road sections in the condition turning into bad road, based on the latest road surface condition information, so that accidents may be obviated.

Figure 11:
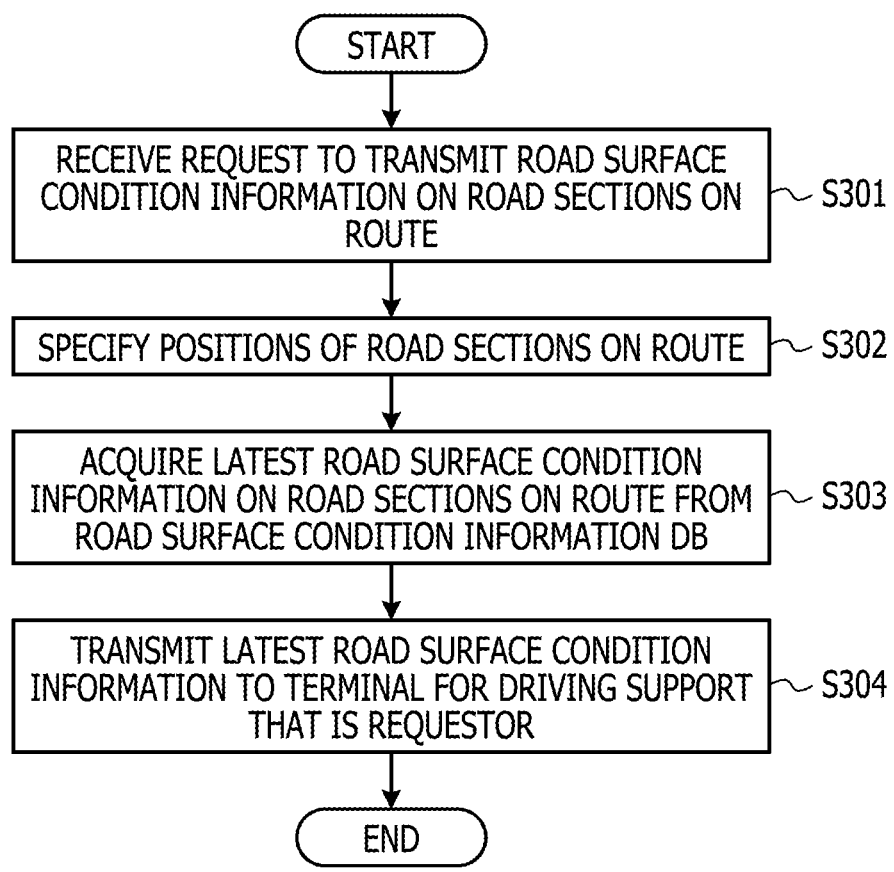
FIG. 11 is a flow chart that illustrates an example of control flow through which the apparatus for driving support transmits the latest road surface condition information to the terminal for driving support upon reception of a request to transmit the road surface condition information from the terminal for driving support.

FIG. 11 is a flow chart that illustrates an example of control flow through which the apparatus for driving support 100 transmits the latest road surface condition information to the terminal for driving support 300 upon reception of the request to transmit the road surface condition information from the terminal for driving support 300.

In accordance with the flow chart illustrated in FIG. 11 with reference to FIG. 2, the control flow will be described through which the apparatus for driving support 100 transmits the latest road surface condition information to the terminal for driving support 300 upon the reception of the request to transmit the road surface condition information from the terminal for driving support 300.

In step S301, the control device 130 receives the request to transmit the road surface condition information on the road sections on the route and then makes a transition of the process to step S302.

In step S302, the control device 130 specifies positions of the road sections on the route that are requested from the terminal for driving support 300, based on the map information stored in the map information DB 121 and then makes a transition of the process to step S303.

In step S303, the control device 130 acquires the latest road surface condition information on the road sections on the route from the road surface condition information DB 124 and then makes a transition of the process to step S304.

In step S304, the control device 130 transmits the latest road surface condition information to the terminal for driving support 300 that is the requestor and then ends the process.

Thus the terminal for driving support 300 that is searching for the route requests the apparatus for driving support 100 to transmit the road surface condition information, acquires the latest road surface condition information transmitted from the apparatus for driving support 100, and is thereby enabled to guide the route by which the road sections in the condition turning into bad road may be avoided, so that accidents may be obviated.

Subsequently, a determination process on the degree of safe driving in step S103, a determination process on the behavioral change in driving in step S203, and a determination process on the road surface condition in step S204 will be described.

Figure 12:
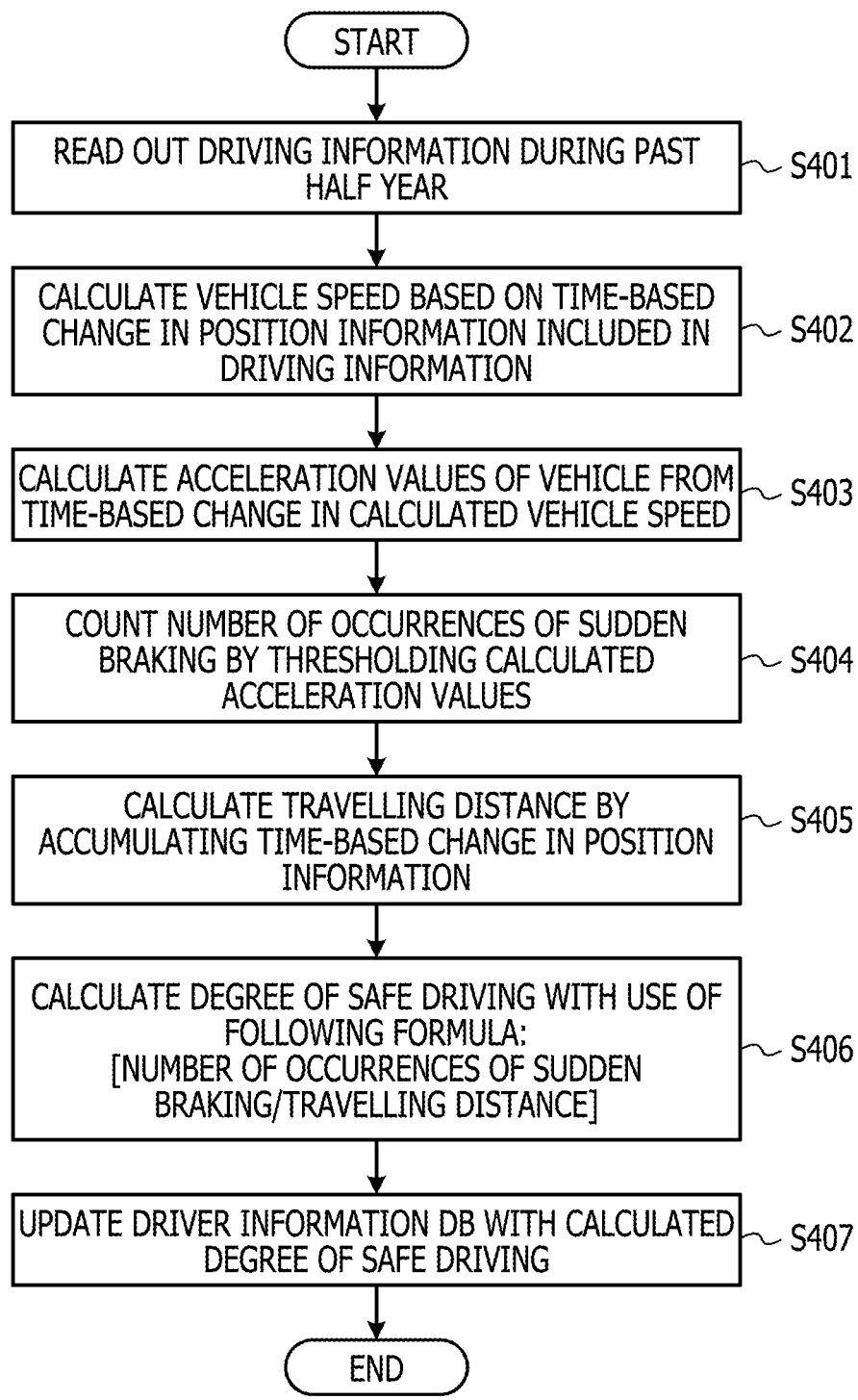
FIG. 12 is a flow chart that illustrates an example of control flow through which the degree of safe driving of the driver is evaluated and the driver information is updated.

FIG. 12 is a flow chart that illustrates an example of control flow through which the degree of safe driving of the driver is evaluated and the driver information is updated.

In accordance with the flow chart illustrated in FIG. 12 with reference to FIG. 2, the control flow will be described through which the degree of safe driving of the driver is evaluated and the driver information is updated.

In step S401, the control device 130 reads out the driving information during the past half year from the driving information DB 122 and then makes a transition of the process to step S402.

In step S402, the safe driving degree evaluation unit 132 calculates the vehicle speed based on the time-based change in the position information included in the driving information and then makes a transition of the process to step S403.

In step S403, the safe driving degree evaluation unit 132 calculates the acceleration value of the vehicle at each time point from the time-based change in the calculated vehicle speed and then makes a transition of the process to step S404.

In step S404, the safe driving degree evaluation unit 132 counts a number of occurrences of sudden braking by thresholding the calculated acceleration values and then makes a transition of the process to step S405.

In step S405, the safe driving degree evaluation unit 132 calculates the travelling distance by accumulating the time-based change in the position information and then makes a transition of the process to step S406.

In step S406, the safe driving degree evaluation unit 132 calculates the degree of safe driving with use of following formula: number of occurrences of sudden braking/travelling distance, and then makes a transition of the process to step S407.

In step S407, the safe driving degree evaluation unit 132 updates the driver information DB 123 with the calculated degree of safe driving and then ends the process.

Figure 13:
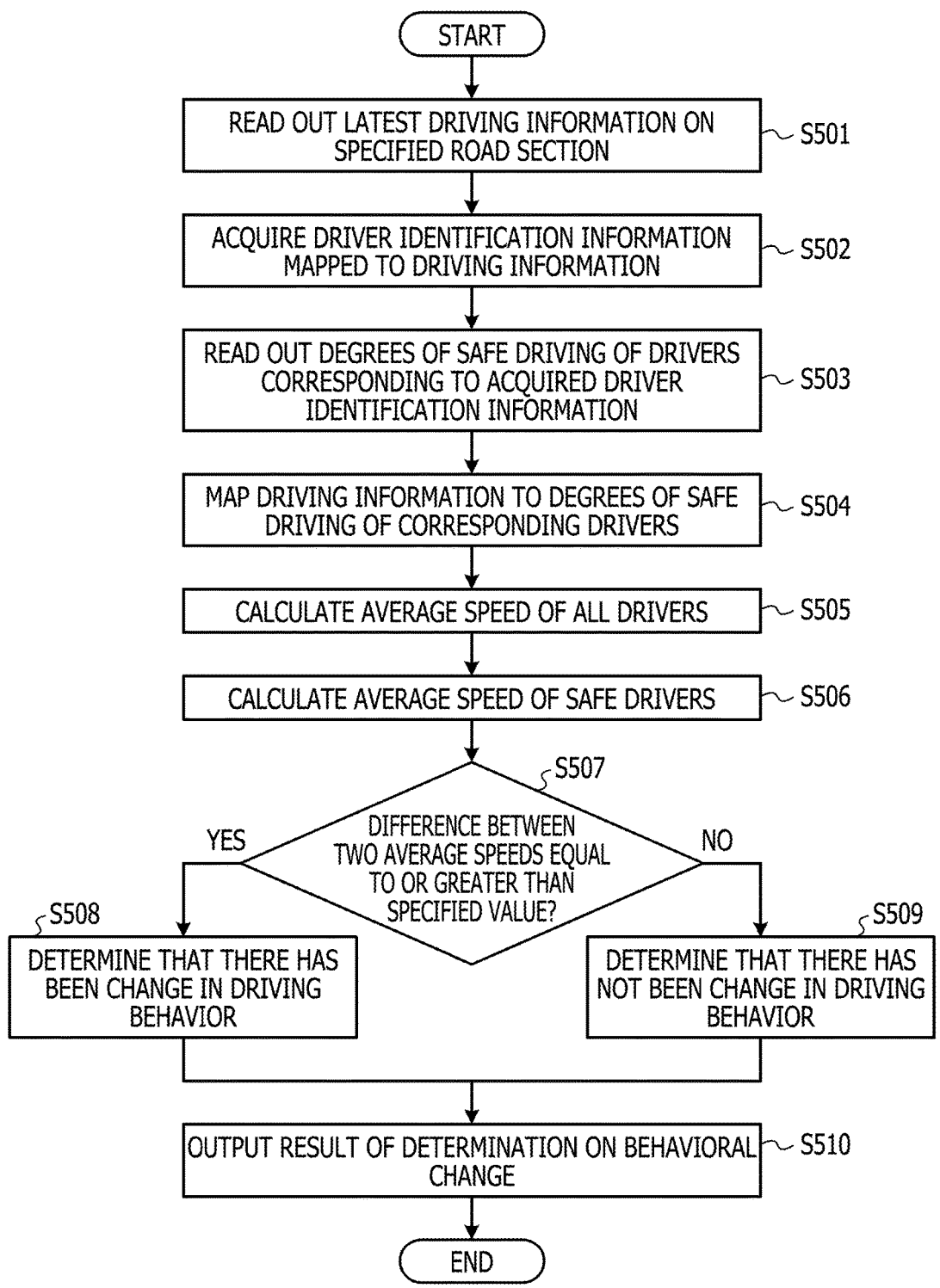
FIG. 13 is a flow chart that illustrates an example of control flow through which it is determined whether there has been a change or not in driving behavior of safe drivers.

FIG. 13 is a flow chart that illustrates an example of control flow through which it is determined whether there has been the change or not in the driving behavior of the safe drivers.

In accordance with the flow chart illustrated in FIG. 13 with reference to FIG. 2, the control flow will be described through which the change in the driving behavior of the safe drivers in the specified road section is determined.

In step S501, the behavioral change determination unit 133 reads out the driving information during the last one hour on the specified road section and then makes a transition of the process to step S502.

In step S502, the behavioral change determination unit 133 acquires the driver identification information mapped to the driving information and then makes a transition of the process to step S503.

In step S503, the behavioral change determination unit 133 reads out the degrees of safe driving of the drivers, corresponding to the acquired driver identification information, from the driver information DB 123 and then makes a transition of the process to step S504.

In step S504, the behavioral change determination unit 133 maps the driving information to the degrees of safe driving of the corresponding drivers and then makes a transition of the process to step S505.

In step S505, the behavioral change determination unit 133 calculates the average vehicle speed of all the drivers and then makes a transition of the process to step S506.

In step S506, the behavioral change determination unit 133 calculates the average vehicle speed of the safe drivers and then makes a transition of the process to step S507.

In step S507, the behavioral change determination unit 133 determines whether a difference between the two average vehicle speeds calculated in steps S505 and S506 (the "average vehicle speed of all the drivers" minus the "average vehicle speed of the safe drivers") is equal to or greater than the specified value or not. When the behavioral change determination unit 133 determines that the difference between the two average vehicle speeds is equal to or greater than the specified value, the behavioral change determination unit 133 makes a transition of the process to step S508. When the behavioral change determination unit 133 determines that the difference between the two average vehicle speeds is smaller than the specified value, the behavioral change determination unit 133 makes a transition of the process to step S509.

In step S508, the behavioral change determination unit 133 determines that there has been the change in the driving behavior and then makes a transition of the process to step S510.

In step S509, the behavioral change determination unit 133 determines that there has not been the change in the driving behavior and then makes a transition of the process to step S510.

In step S510, the behavioral change determination unit 133 outputs a result of the determination on the behavioral change and then ends the process.

Thus comparison between the average speed of the safe drivers and the average speed of all the drivers makes it possible to determine whether there has been the change or not in the driving behavior of the safe drivers.

Figure 14:
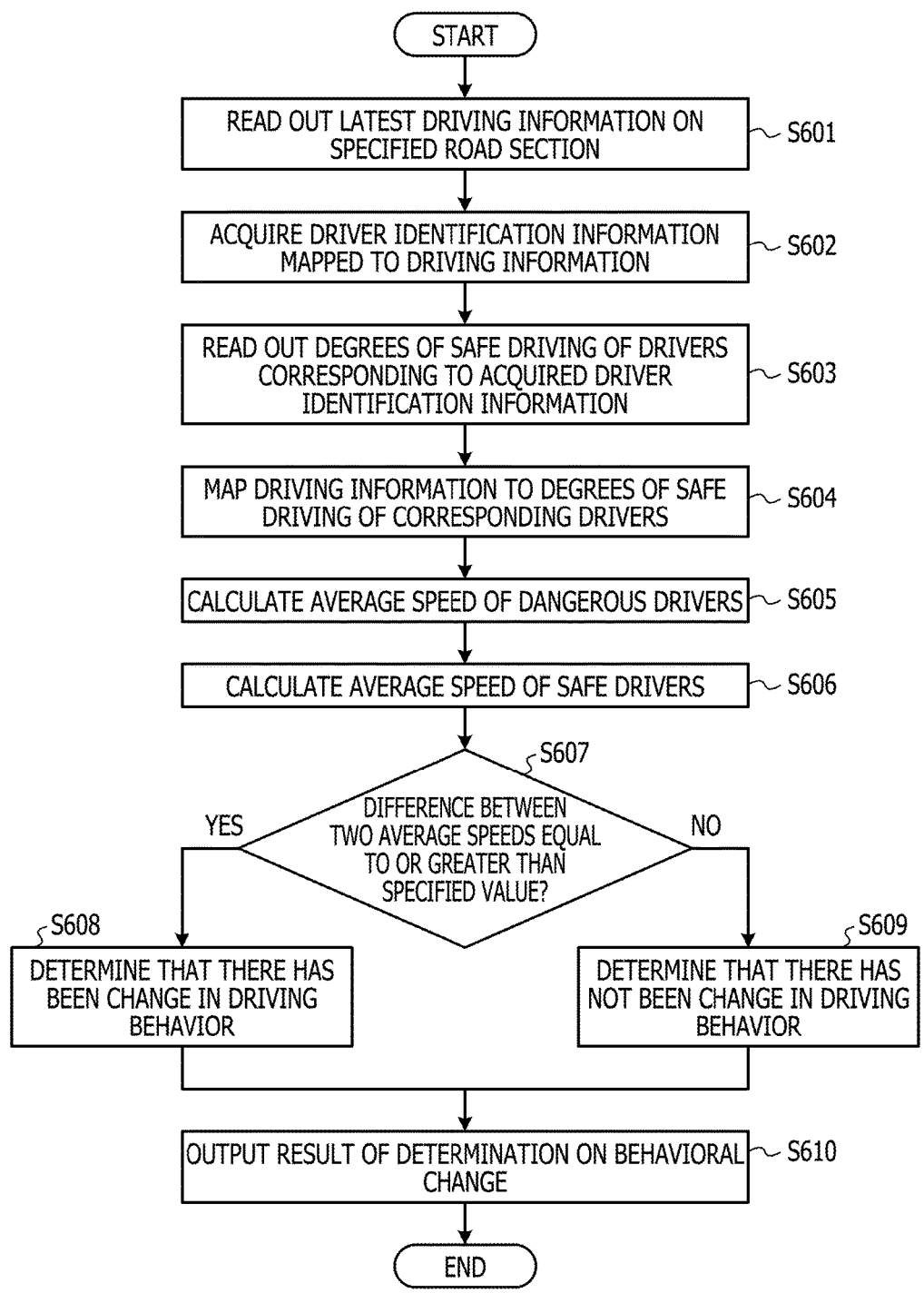
FIG. 14 is a flow chart that illustrates another example of the control flow through which it is determined whether there has been the change or not in the driving behavior of the safe drivers.

FIG. 14 is a flow chart that illustrates another example of the control flow through which it is determined whether there has been the change or not in the driving behavior of the safe drivers.

Though the average vehicle speed of the safe drivers and the average vehicle speed of all the drivers are compared in FIG. 13, the behavioral change related to the safe drivers may be more accurately determined by comparison between the average vehicle speed of the safe drivers and the average vehicle speed of the dangerous drivers in FIG. 14.

In FIG. 14, flow of step S505 in FIG. 13 through which the average speed of "all the drivers" is calculated is modified into flow through which the average speed of "the dangerous drivers". Therefore, description on the flow chart illustrated in FIG. 14 is omitted.

Thus the comparison between the average speed of the safe drivers and the average speed of the dangerous drivers makes it possible to more clearly determine whether there has been the change or not in the driving behavior of the safe drivers.

FIG. 15 is a flow chart that illustrates an example of control flow through which a road surface condition is determined into any of three conditions.

In accordance with the flow chart illustrated in FIG. 15 with reference to FIG. 2, the control flow will be described through which the driving behavior of the safe drivers and the "condition turning into bad road" are determined based on the latest driving information on the safe drivers in the specified road section and in case where there has not been the change in the driving behavior of the safe drivers, it is determined whether the road surface condition is in the "condition having turned into bad road" or in the "condition being not bad road", in conjunction with an external service that delivers weather information.

In step S701, the road surface condition determination unit 134 acquires the result of the determination on the behavioral change in the specified road section and then makes a transition of the process to step S702.

When it is determined from the acquired result of the determination in step S702 that there has been the change in the driving behavior of the safe drivers, a transition of the process to step S703 is made. When it is determined that there has not been the change in the driving behavior of the safe drivers, a transition of the process to step S704 is made.

In step S703, the road surface condition determination unit 134 determines that the specified road section is in the "condition turning into bad road" and then makes a transition of the process to step S708.

In step S704, the road surface condition determination unit 134 acquires the weather information on the specified road section and then makes a transition of the process to step S705.

In step S705, the behavioral change determination unit 133 determines from the weather information whether it is rainy or snowy weather or not. When the behavioral change determination unit 133 determines that it is rainy or snowy weather, the behavioral change determination unit 133 makes a transition of the process to step S706. When the behavioral change determination unit 133 determines that it is neither rainy nor snowy weather, the behavioral change determination unit 133 makes a transition of the process to step S707.

In step S706, the road surface condition determination unit 134 determines that the specified road section is in the "condition having turned into bad road" and then makes a transition of the process to step S708.

In step S707, the road surface condition determination unit 134 determines that the specified road section is in the "condition being not bad road" and then makes a transition of the process to step S708.

In step S708, the road surface condition determination unit 134 updates the road surface condition information on the specified road section, based on the result of the determination on the road surface condition and then ends the process.

Thus the apparatus for driving support 100 determines the road surface condition in the road section as any of the three conditions, that is, the "condition turning into bad road", the "condition having turned into bad road", and the "condition being not bad road" and thereby updates the road surface condition information. Accordingly, the latest road surface condition information may be delivered to the plurality of terminals for driving support 300. As a result, the terminals for driving support 300 are enabled to inform other drivers or the like of presence of the road sections that are determined as any of the three conditions, so that accidents may be obviated.

In the embodiment, the apparatus for driving support 100 includes the storage device 120 and the control device 130 and stores the map information, as well as the driving information, the driver information, and the road surface condition information that are acquired through the processes in the control device 130, in the databases in the storage device 120. Without limitation to the above, however, the terminals for driving support 300 may each have functions of the storage device 120 and the control device 130 and the information in the databases in the storage device 120 may be backuped from time to time into a cloud server. Even when an abnormality in the storage device 120 in the terminal for driving support 300 is caused by vibrations during driving, an accident, or the like, the information backuped in the cloud server may be used in an above example. A large amount of information, such as the driving information during a considerable period, is transmitted to the cloud server and thus it is desirable to backup the information into the cloud server when there is a satisfactory communication state.

Furthermore, the terminals for driving support 300 may each have the functions of the storage device 120 and the control device 130 and the apparatus for driving support 100 may include the storage device 120 and the control device 130. Similar information may be stored in the storage devices 120 on both sides so that influence of an occurrence of an abnormality in the storage device 120 on one side on operation of the system for driving support 10 may be obviated by use of the storage device 120 on the other side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system for driving support, comprising:
   a terminal configured to be mounted on a vehicle and acquire driving information including data acquired during the vehicle being driven by a driver; and
   a control device configured to collect, from the terminal, the driving information associated with driver identification information for identification of the driver of the vehicle,
   wherein the terminal includes a first processor configured to acquire the driving information and transmit the driving information to the control device, and
   wherein the control device includes a second processor configured to
   execute an evaluation process that includes evaluating a degree of safe driving of the driver in accordance with the driving information corresponding to the driver indicated by the driver identification information,
   execute a behavioral change determination process that includes
      determining whether the degree of safe driving of the driver is higher than a threshold, and determining whether driving behavior of the driver varies in accordance with the driving information corresponding to the driver when the degree of safe driving of the driver is higher than the threshold, execute a road surface condition determination process that includes determining that a road section identified by the driving information corresponding to the driver is in a condition turning into bad road when the behavioral change determination process determines that the driving behavior of the driver is varied, and execute an update process that includes updating road surface condition information that indicates a road surface condition in the road section, based on a result of determination in the road surface condition determination process.

2. The system according to claim 1, wherein the control device is further configured to deliver the road surface condition information.

3. The system according to claim 1, wherein the terminal is further configured to receive the road surface condition information delivered from the control device and inform the driver of the road section indicated by the road surface condition information.

4. The system according to claim 1, wherein the behavioral change determination process includes comparing first driving behavior indicated by the driving information that corresponds to the driver with second driving behavior of other drivers in the behavioral change determination process, the second driving behavior being indicated by a plurality of pieces of the driving information that are collected from a plurality of second terminals mounted on second vehicles, the plurality of pieces of the driving information corresponding to the other drivers.

5. The system according to claim 1, wherein the behavioral change determination process includes comparing first driving behavior indicated by the driving information corresponding to the driver with second driving behavior of other driver in the behavioral change determination process, the second driving behavior being indicated by the driving information corresponding to a second driver for whom a low evaluation is made on the degree of safe driving.

6. The system according to claim 1, wherein the bad road includes a road on which a road surface condition has been worsened, a road in a condition in which visibility has been worsened, or a road in a condition in which decrease in a vehicle speed is desired due to a weather phenomenon, or any combination thereof.

7. The system according to claim 1, wherein the driving information includes position information, vehicle speed information, or time information, or any combination thereof.

8. The system according to claim 1, wherein the change in the driving behavior includes a slowdown, ensuring of a long inter-vehicle distance, or avoidance of hard braking, or any combination thereof.

9. The system according to claim 1, wherein the evaluation process includes acquiring the number of occurrences of sudden braking and a travelling distance, in accordance with the driving information that is collected in a specified period and that corresponds to the driver, and calculating a value obtained by division of the number of occurrences of the sudden braking by the travelling distance in order to acquire the degree of safe driving.

10. A control device for driving support, comprising:
a memory; and
a processor coupled to the memory and configured to
execute a collecting process that includes collecting, from a terminal mounted on a vehicle driven by a driver, driving information corresponding to the driver, the driving information including data acquired by the terminal during the vehicle being driven by the driver, execute an evaluation process that includes evaluating a degree of safe driving of the driver in accordance with the driving information, execute a behavioral change determination process that includes
determining whether the degree of safe driving of the driver is higher than a threshold, and
determining whether driving behavior of the driver varies in accordance with the driving information corresponding to the driver when the degree of safe driving of the driver is higher than the threshold, execute a road surface condition determination process that includes determining that a road section identified by the driving information corresponding to the driver is in a condition turning into bad road when the behavioral change determination process determines that the driving behavior of the driver is varied, and execute an update process that includes updating road surface condition information that indicates a road surface condition in the road section, based on a result of determination in the road surface condition determination process.

11. A driving support terminal configured to be associated with a vehicle, comprising:
a memory; and
a processor coupled to the memory and configured to
acquire driving information including data acquired during the vehicle being driven by a driver,
transmit the driving information to a control apparatus, the control apparatus being configured to execute a collecting process that includes receiving the driving information, execute an evaluation process that includes evaluating a degree of safe driving of the driver in accordance with the driving information, execute a behavioral change determination process that includes determining whether the degree of safe driving of the driver is higher than a threshold, and determining whether driving behavior of the driver varies in accordance with the driving information when the degree of safe driving of the driver is higher than the threshold, execute a road surface condition determination process that includes determining that a road section identified by the driving information is in a condition turning into bad road when the behavioral change determination process determines that the driving behavior of the driver is varied, and execute an update process that includes updating road surface condition information that indicates a road surface condition in the road section, based on a result of determination in the road surface condition determination process, receive the road surface condition information from the control apparatus in response to transmitting the driving information, output an indication for the driver in accordance with the road surface condition information.

12. A method for driving support, performed by a computer, the method comprising:

executing a collecting process that includes collecting, from a terminal mounted on a vehicle driven by a driver, driving information corresponding to the driver, the driving information including data acquired by the terminal during the vehicle being driven by the driver;

executing an evaluation process that includes evaluating a degree of safe driving of the driver in accordance with the driving information;

executing a behavioral change determination process that includes determining whether the degree of safe driving of the driver is higher than a threshold, and determining whether driving behavior of the driver varies in accordance with the driving information corresponding to the driver when the degree of safe driving of the driver is higher than the threshold;

executing a road surface condition determination process that includes determining that a road section identified by the driving information corresponding to the driver is in a condition turning into bad road when the behavioral change determination process determines that the driving behavior of the driver is varied; and executing an update process that includes updating road surface condition information that indicates a road surface condition in the road section, based on a result of determination in the road surface condition determination process.

* * * * *